US011751279B2

(12) United States Patent
Huang-Fu et al.

(10) Patent No.: US 11,751,279 B2
(45) Date of Patent: Sep. 5, 2023

(54) APPARATUSES AND METHODS FOR MULTI-RADIO ACCESS TECHNOLOGY (RAT) COORDINATION

(71) Applicant: MEDIATEK INC., Hsinchu (TW)

(72) Inventors: Chien-Chun Huang-Fu, Hsinchu (TW); Chun-Fan Tsai, Hsinchu (TW); I-Kang Fu, Hsinchu (TW); Chin-Chia Chang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 123 days.

(21) Appl. No.: 17/123,296

(22) Filed: Dec. 16, 2020

(65) Prior Publication Data

US 2021/0212155 A1 Jul. 8, 2021

Related U.S. Application Data

(60) Provisional application No. 62/957,955, filed on Jan. 7, 2020.

(51) Int. Cl.
*H04W 76/30* (2018.01)
*H04W 76/27* (2018.01)

(52) U.S. Cl.
CPC .......... *H04W 76/30* (2018.02); *H04W 76/27* (2018.02)

(58) Field of Classification Search
CPC ..... H04W 76/30; H04W 76/27; H04W 8/183; H04W 36/0022; H04W 88/06; H04W 76/38; H04W 36/14; H04W 36/0055; H04W 36/165
See application file for complete search history.

(56) References Cited

U.S. PATENT DOCUMENTS

2012/0250601 A1\* 10/2012 Choi ..................... H04W 88/04
370/329
2014/0092800 A1\* 4/2014 Cho ....................... H04W 72/04
370/328
2014/0308953 A1\* 10/2014 Park ..................... H04W 76/16
455/436

(Continued)

FOREIGN PATENT DOCUMENTS

WO 2019/148654 A1 8/2019

OTHER PUBLICATIONS

Chinese language office action dated Dec. 21, 2021, issued in application No. TW 110100392.

(Continued)

*Primary Examiner* — Will W Lin
(74) *Attorney, Agent, or Firm* — Oblon, McClelland, Maier & Neustadt, L.L.P.

(57) ABSTRACT

A User Equipment (UE) including a wireless transceiver and a controller is provided. The wireless transceiver performs wireless transmission and reception to and from a first service network utilizing a first RAT or a second service network utilizing a second RAT. The controller sends an indicator of a connection release request to the first service network via the wireless transceiver in response to terminating a first communication service with the first service network or in response to leaving the first service network for the second service network. Also, the controller releases a Radio Resource Control (RRC) connection with the first service network after sending the indicator of the connection release request.

14 Claims, 7 Drawing Sheets

(56) References Cited

U.S. PATENT DOCUMENTS

| | | | | |
|---|---|---|---|---|
| 2014/0342740 A1* | 11/2014 | Kim | ............... | H04W 36/14 |
| | | | | 455/437 |
| 2015/0195865 A1* | 7/2015 | Lee | ............... | H04W 68/02 |
| | | | | 455/426.1 |
| 2016/0080996 A1* | 3/2016 | Fukuta | ............. | H04W 52/0225 |
| | | | | 370/311 |
| 2016/0192408 A1* | 6/2016 | Martinez Tarradell | ............... | |
| | | | | H04L 41/082 |
| | | | | 370/329 |
| 2018/0115929 A1* | 4/2018 | Wu | ............... | H04W 12/106 |
| 2018/0213576 A1 | 7/2018 | Koskinen | | |
| 2018/0302947 A1* | 10/2018 | Yan | ............... | H04W 76/38 |
| 2019/0116526 A1* | 4/2019 | Tiwari | ............. | H04W 48/18 |
| 2019/0373593 A1* | 12/2019 | Patil | ............... | H04W 76/15 |
| 2020/0059832 A1* | 2/2020 | Wang | ............... | H04W 76/27 |
| 2020/0154510 A1* | 5/2020 | Yilmaz | ............. | H04W 76/18 |
| 2020/0280836 A1* | 9/2020 | Velev | ............. | H04W 76/19 |
| 2020/0396780 A1* | 12/2020 | Jeong | ............. | H04W 60/06 |
| 2021/0105078 A1* | 4/2021 | Majmundar | ......... | H04W 68/02 |
| 2021/0126992 A1* | 4/2021 | Jung | ............... | H04B 7/0628 |
| 2021/0195405 A1* | 6/2021 | Gurumoorthy | ....... | H04W 76/27 |

OTHER PUBLICATIONS

Intel; "Revised SID: Study on System Enablers for Multi-SIM Devices;" 3GPP TSG-SA WG2 Meeting #130, S2-1900688; Jan. 2019; pp. 1-4.

* cited by examiner

APPARATUSES AND METHODS FOR MULTI-RADIO ACCESS TECHNOLOGY (RAT) COORDINATION

CROSS REFERENCE TO RELATED APPLICATIONS

This Application claims priority of U.S. Provisional Application No. 62/957,955, filed on Jan. 7, 2020, the entirety of which is incorporated by reference herein.

BACKGROUND OF THE APPLICATION

Field of the Application

The application generally relates to mobile communications and, more particularly, to apparatuses and methods for multi-Radio Access Technology (RAT) coordination.

Description of the Related Art

In a typical mobile communication environment, User Equipment (UE) (also called Mobile Station (MS)), such as a mobile telephone (also known as a cellular or cell phone), or a tablet Personal Computer (PC) with wireless communications capability, may communicate voice and/or data signals to one or more service networks. The wireless communications between the UE and the service networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, Time-Division LTE (TD-LTE) technology, New Radio (NR) technology, and others. In particular, the GSM/GPRS/EDGE technology is also called 2G cellular technology; the WCDMA/CDMA-2000/TD-SCDMA technology is also called 3G cellular technology; the LTE/LTE-A/TD-LTE technology is also called 4G cellular technology; and the NR technology is also called 5G cellular technology.

A mobile phone generally supports multiple RATs, and coordination between the RATs would be necessary to provide the user with flexible mobile communications at all times via the supported RATs. For instance, a multi-mode mobile phone (e.g., a mobile phone supporting both the 4G and 5G cellular technologies) may fall back from a 5G network to a 4G network to make a voice call, but after the voice call is finished, the 4G network may not trigger the inter-system handover or redirection for the mobile phone to return to the 5G network. As a result, the mobile phone may be kept in the 4G network and not be able to obtain faster mobile broadband Internet access from the 5G network.

In addition, coordination between the RATs would be necessary for multi-Subscriber Identity Module (SIM) mobile phones. For instance, a multi-SIM mobile phone currently communicating with a first Public Land Mobile Network (PLMN) using SIM1 may determine to perform a specific activity with a second PLMN using SIM2, and then locally release the connection with the first PLMN due to the restriction of a single Radio Frequency (RF) device. After the activity with the second PLMN on SIM2 is finished, the multi-SIM mobile phone may try to re-establish the connection with the first PLMN using SIM1. However, the re-established connection may be over a different RAT. That is, the Protocol Data Unit (PDU) session or Packet Data Network (PDN) connection may not be preserved, or the mobile phone may be required to re-attach to or register with the first PLMN using SIM1, and thus, the user may experience obvious service discontinuity.

A solution is sought.

BRIEF SUMMARY OF THE APPLICATION

The present application proposes to enable a multi-mode UE to return to 5G as soon as the voice call service in 4G is finished or enable a multi-SIM UE to synchronize the connection state with the current RAT network before leaving for another RAT network using another SIM, by allowing the UE to proactively request connection release.

In a first aspect of the application, a UE comprising a wireless transceiver and a controller is provided. The wireless transceiver is configured to perform wireless transmission and reception to and from a first service network utilizing a first RAT or a second service network utilizing a second RAT. The controller is configured to send an indicator of a connection release request to the first service network via the wireless transceiver in response to terminating a first communication service with the first service network or in response to leaving the first service network for the second service network, and release a Radio Resource Control (RRC) connection with the first service network after sending the indicator of the connection release request.

In a first implementation form of the first aspect of the application, the indicator of the connection release request is sent in a Non-Access Stratum (NAS) message or an RRC message.

In a second implementation form of the first aspect of the application in combination with the first implementation form of the first aspect of the application, the NAS message is an Evolved Packet System (EPS) Mobility Management (EMM) message or an EPS Session Management (ESM) message in response to the first service network being an EPS; or the NAS message is a 5G Mobility Management (5GMM) message in response to the first service network being a 5G System (5GS).

In a third implementation form of the first aspect of the application in combination with the second implementation form of the first aspect of the application, the EMM message is a Tracking Area Update message or an EMM Status message; the ESM message is a Bearer Resource Modification Request message or an ESM Status message; and the 5GMM message is a Registration Request message, an UL NAS transport message, or a 5GMM Status message.

In a fourth implementation form of the first aspect of the application in combination with the first implementation form of the first aspect of the application, the RRC message is a UE Assistance Information message.

In a fifth implementation form of the first aspect of the application, the controller is further configured to receive an RRC Connection Release message from the first service network via the wireless transceiver in response to sending the indicator of the connection release request, and the releasing of the RRC connection with the first service network is performed in response to the RRC Connection Release message.

In a sixth implementation form of the first aspect of the application, the controller is further configured to start a timer in response to sending the indicator of the connection release request, and the releasing of the RRC connection with the first service network is performed in response to the timer expiring and not receiving an RRC Connection Release message from the first service network.

In a seventh implementation form of the first aspect of the application, the controller is further configured to reselect from the first service network to the second service network via the wireless transceiver in response to releasing the RRC connection with the first service network.

In an eighth implementation form of the first aspect of the application, the first communication service is a Voice over Long Term Evolution (LTE) (VoLTE) call.

In a ninth implementation form of the first aspect of the application, the leaving of the first service network for the second service network comprises initiating a specific activity with the second service network using a second subscriber identity when a first communication service with the first service network is ongoing using a first subscriber identity.

In a second aspect of the application, a method, executed by a UE communicatively connected to a first service network utilizing a first RAT or a second service network utilizing a second RAT, is provided. The method comprises the following steps: sending an indicator of a connection release request to the first service network in response to terminating a first communication service with the first service network or in response to leaving the first service network for the second service network; and releasing an RRC connection with the first service network after sending the indicator of the connection release request.

In a first implementation form of the second aspect of the application, the indicator of the connection release request is sent in a NAS message or an RRC message.

In a second implementation form of the second aspect of the application in combination with the first implementation form of the second aspect of the application, the NAS message is an EMM message or an ESM message in response to the first service network being an EPS; or the NAS message is a 5GMM message in response to the first service network being a 5GS.

In a third implementation form of the second aspect of the application in combination with the second implementation form of the second aspect of the application, the EMM message is a Tracking Area Update message or an EMM Status message; the ESM message is a Bearer Resource Modification Request message or an ESM Status message; and the 5GMM message is a Registration Request message, an UL NAS transport message, or a 5GMM Status message.

In a fourth implementation form of the second aspect of the application in combination with the first implementation form of the second aspect of the application, the RRC message is a UE Assistance Information message.

In a fifth implementation form of the second aspect of the application, the method further comprises the following steps: receiving an RRC Connection Release message from the first service network in response to sending the indicator of the connection release request; wherein the releasing of the RRC connection with the first service network is performed in response to the RRC Connection Release message.

In a sixth implementation form of the second aspect of the application, the method further comprises the following steps: starting a timer in response to sending the indicator of the connection release request; wherein the releasing of the RRC connection with the first service network is performed in response to the timer expiring and not receiving an RRC Connection Release message from the first service network.

In a seventh implementation form of the second aspect of the application, the method further comprises the following steps: reselecting from the first service network to the second service network in response to releasing the RRC connection with the first service network.

In an eighth implementation form of the second aspect of the application, the first communication service is a VoLTE call.

In a ninth implementation form of the second aspect of the application, the leaving of the first service network for the second service network comprises initiating a specific activity with the second service network using a second subscriber identity when a first communication service with the first service network is ongoing using a first subscriber identity.

Other aspects and features of the present application will become apparent to those with ordinarily skill in the art upon review of the following descriptions of specific embodiments of the apparatuses and the methods for multi-RAT coordination.

BRIEF DESCRIPTION OF THE DRAWINGS

The present application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
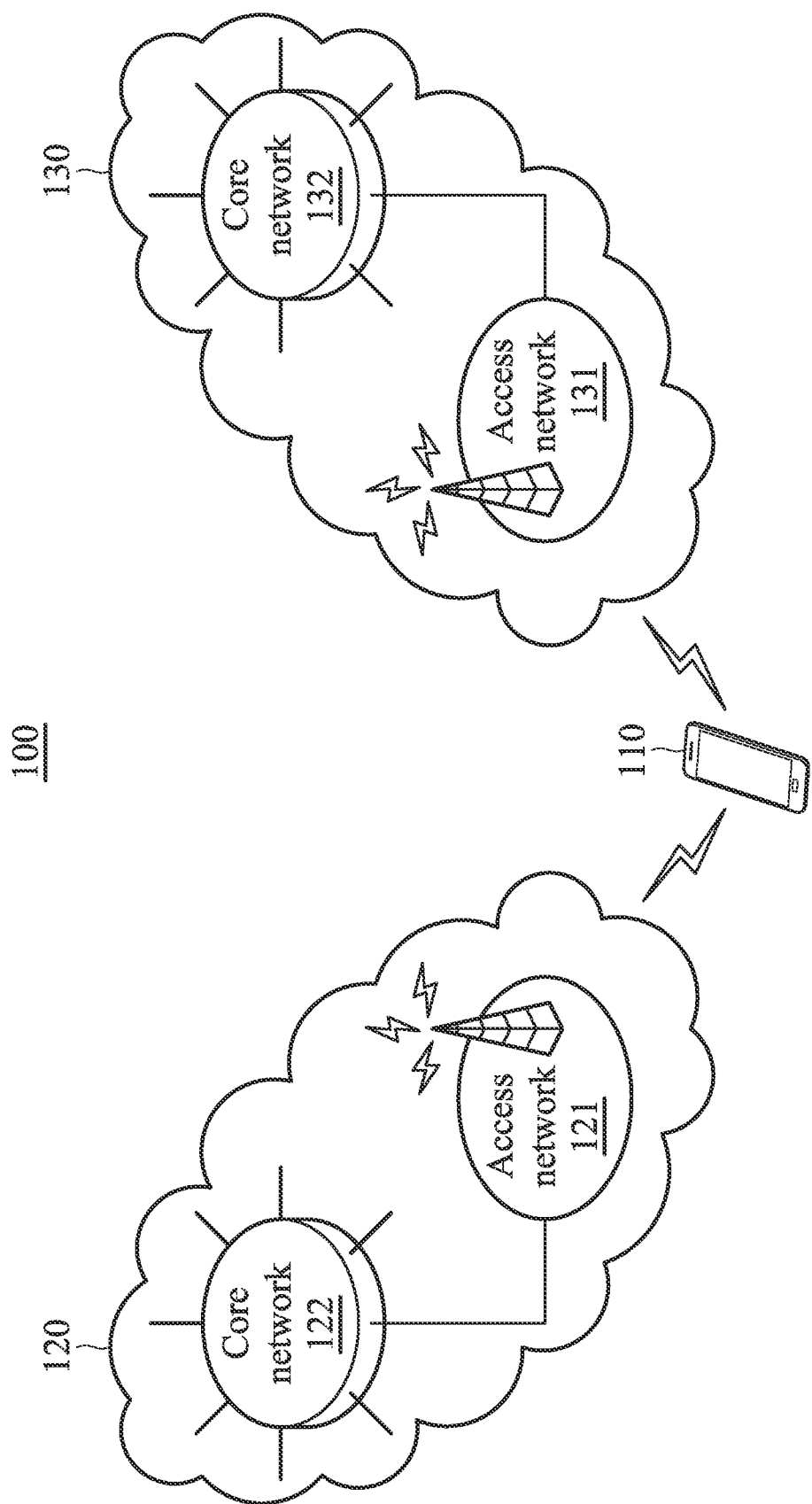
FIG. 1 is a block diagram of a mobile communication environment according to an embodiment of the application.

FIG. 1 is a block diagram of a mobile communication environment according to an embodiment of the application. As shown in FIG. 1, the mobile communication environment 100 may include a User Equipment (UE) 110 and two service networks 120 and 130.

The UE 110 may be a feature phone, a smartphone, a panel Personal Computer (PC), a laptop computer, or any wireless communication device supporting the RATs utilized by the service networks 120 and 130.

The UE 110 may be selectively connected to one or both of the service networks 120 and 130 using one or more subscriber identities (or referred to as subscriber numbers). The subscriber identities may be provided by one or two subscriber identity cards (not shown) in compliance with the specifications of the RATs utilized by the service networks 120 and 130. For example, the subscriber identity cards may include a Subscriber Identity Module (SIM) card if one of the service networks 120 and 130 is a GSM/GPRS/EDGE/IS-95 network, or may include a Universal SIM (USIM) card if one of the service networks 120 and 130 is a WCDMA/LTE/LTE-A/TD-LTE/NR network. Alternatively, the subscriber identities may be directly written into the UE 110, without the need for any socket to insert any subscriber identity card, or the subscriber identities may be provided by one or more virtual subscriber identity cards (e.g., eSIM/eUSIM), and the present application is not limited thereto.

The service network 120 may include an access network 121 and a core network 122, while the service network 130 may include an access network 131 and a core network 132. The access networks 121 and 131 are responsible for processing radio signals, terminating radio protocols, and connecting the UE 110 with the core networks 122 and 132, respectively. The core networks 122 and 132 are responsible for performing mobility management, network-side authentication, and interfaces with public/external networks (e.g., the Internet). The access networks 121 and 131, and the core networks 122 and 132 may each comprise one or more network nodes for carrying out said functions.

In particular, the service networks 120 and 130 utilize different RATs.

For example, the service network 120 may be a 5G System (5GS) utilizing the NR technology, and the access network 121 and the core network 122 may be a Next Generation Radio Access Network (NG-RAN) and a Next Generation Core Network (NG-CN), respectively.

An NG-RAN may include one or more cellular stations, such as next generation NodeBs (gNBs), which support high frequency bands (e.g., above 24 GHz), and each gNB may further include one or more Transmission Reception Points (TRPs). Some gNB functions may be distributed across different TRPs, while others may be centralized, leaving the flexibility and scope of specific deployments to fulfill the requirements for specific cases.

A NG-CN generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

For example, the service network 130 may be an Evolved Packet System (EPS) utilizing the LTE/LTE-A/TD-LTE technology, and the access network 131 and the core network 132 may be an Evolved-Universal Terrestrial Radio Access Network (E-UTRAN) and an Evolved Packet Core (EPC), respectively.

The E-UTRAN may include at least an evolved NodeB (eNB) (e.g., a macro eNB, femto eNB, or pico eNB). The EPC may include a Home Subscriber Server (HSS), Mobility Management Entity (MME), Serving Gateway (S-GW), and Packet Data Network Gateway (PDN-GW or P-GW).

The HSS is a central database that contains user-related and subscription-related information. The functions of the HSS include functionalities such as mobility management, call and session establishment support, user authentication and access authorization.

The MME is responsible for idle mode UE paging and tagging procedures including retransmissions. It is involved in the bearer activation/deactivation process and is also responsible for choosing the S-GW for the UE 110 at the initial attach and at time of intra-LTE handover involving Core Network (CN) node relocation. It is also responsible for user authentication (by interacting with the HSS) and generation/allocation of temporary identities to the UE 110. It is also the termination point in the network for ciphering/integrity protection for Non Access Stratum (NAS) signaling and handles the security key management.

The S-GW is responsible for routing and forwarding user data packets, while also acting as the mobility anchor for the user plane during inter-eNB handovers and as the anchor for mobility between LTE and other 3GPP technologies.

The P-GW provides connectivity from the UE 110 to external PDNs by being the point of exit and entry of traffic for the UE 110. The PGW also provides the functions of policy enforcement, packet filtering for each user, charging support, lawful interception, and packet screening.

It should be understood that the mobile communication environment 100 described in the embodiment of FIG. 1 is for illustrative purposes only and is not intended to limit the scope of the application. For example, the service network 120 may be a 6G network, while the service network 130 may be a 5GS; or the service network 120 may be an EPS, while the service network 130 may be a 5GS.

Figure 2:
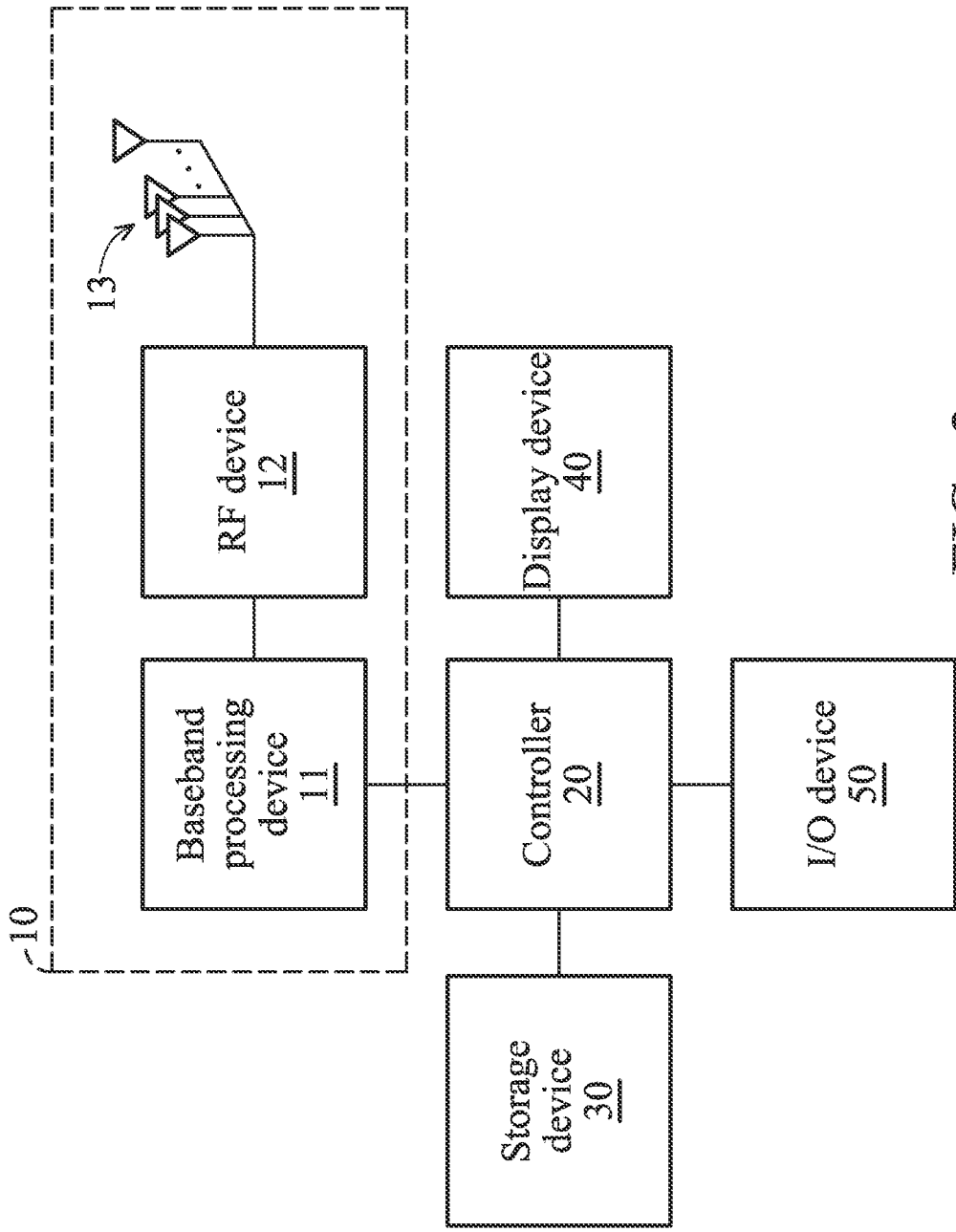
FIG. 2 is a block diagram illustrating a UE according to an embodiment of the application.

FIG. 2 is a block diagram illustrating a UE according to an embodiment of the application.

As shown in FIG. 2, a UE may include a wireless transceiver 10, a controller 20, a storage device 30, a display device 40, and an Input/Output (I/O) device 50.

The wireless transceiver 10 is configured to perform wireless transmission and reception to and from the service network 120 and/or the service network 130.

Specifically, the wireless transceiver 10 may include a baseband processing device 11, a Radio Frequency (RF) device 12, and antenna 13, wherein the antenna 13 may include an antenna array for beamforming.

The baseband processing device 11 is configured to perform baseband signal processing and control the communications between subscriber identity card(s) (not shown) and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may comprise a mixer to multiply the baseband signals with a carrier oscillated in the radio frequency of the supported RAT(s), wherein the radio frequency may be any radio frequency (e.g., 30 GHz-300 GHz for mmWave) utilized in the NR technology, or may be 900 MHz, 2100 MHz, or 2.6 GHz utilized in the LTE/LTE-A/TD-LTE technology, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communication with the service network 120 and/or the service network 130, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 for performing the method of the present application.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the method of the present application.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, a UE may include more components, such as a power supply, a Global Positioning System (GPS) device, and/or another wireless transceiver. The power supply may be a mobile/replaceable battery providing power to all the other components of the UE. The GPS device may provide the location information of the UE for use by some location-based services or applications. In case the UE supports dual registration with 5GS and EPS, an additional wireless transceiver may be used for wireless transmission and reception to and from one service network, while the wireless transceiver 10 may be used for wireless transmission and reception to and from another service network. Alternatively, a UE may include fewer components. For example, a UE may not include the display device 40 and/or the I/O device 50.

Figure 3:
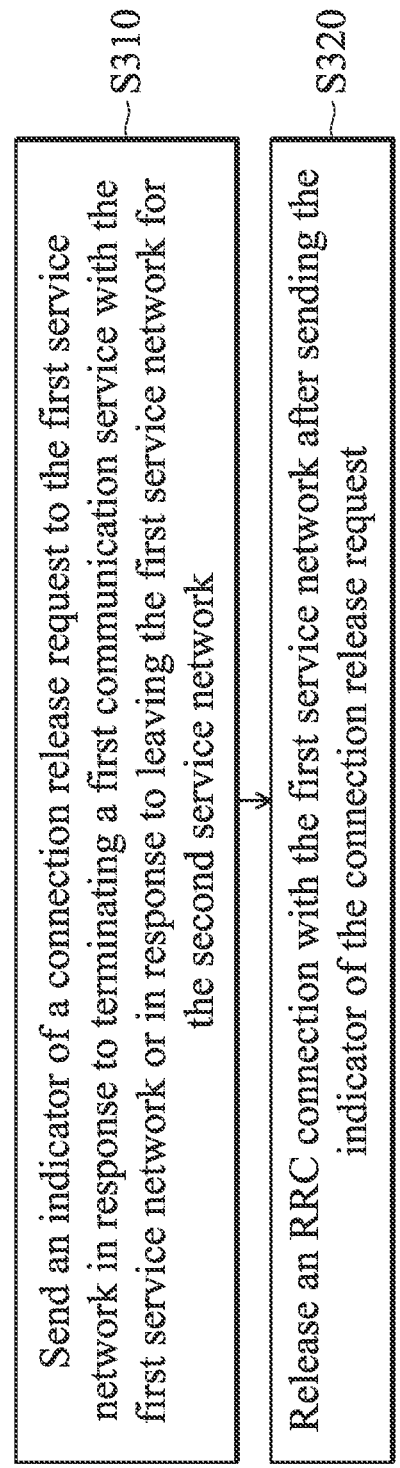
FIG. 3 is a flow chart illustrating the method for multi-RAT coordination according to an embodiment of the application.

FIG. 3 is a flow chart illustrating the method for multi-RAT coordination according to an embodiment of the application.

In this embodiment, the method for multi-RAT coordination may be applied to and executed by a UE (e.g., the UE 110) wirelessly and communicatively connected to one or both of a first service network (e.g., the service network 120) utilizing a first RAT and a second service network (e.g., the service network 130) utilizing a second RAT.

To begin with, the UE sends an indicator of a connection release request to the first service network in response to terminating a first communication service with the first service network or in response to leaving the first service network for the second service network (step S310).

In one embodiment, the indicator of the connection release request may be sent in a Non-Access Stratum (NAS) message.

Specifically, the NAS message may be an Evolved Packet System (EPS) Mobility Management (EMM) message or an EPS Session Management (ESM) message, if the first service network is an EPS. For example, the EMM message may be a Tracking Area Update message or an EMM Status message, and the ESM message may be a Tracking Area Update message or an EMM Status message.

Alternatively, the NAS message may be a 5G Mobility Management (5GMM) message, if the first service network is a 5GS. For example, the 5GMM message may be a Registration Request message, an UL NAS transport message, or a 5GMM Status message.

In another embodiment, the indicator of the connection release request may be sent in a Radio Resource Control (RRC) message. For example, the RRC message may be a UE Assistance Information message.

It should be noted that the indicator of the connection release request is a new Information Element (IE) introduced in the NAS message or the RRC message.

Subsequent to step S310, the UE releases an RRC connection with the first service network after sending the indicator of the connection release request (step S320).

In one embodiment, both the UE and the first service network may locally release the RRC connection in response to the indicator of the connection release request, without waiting or sending a response to the indicator. That is, the UE may locally release the RRC connection upon sending the indicator of the connection release request, while the first service network may locally release the RRC connection upon receiving the indicator of the connection release request.

In another embodiment, the UE may have to wait for an RRC Connection Release message from the first service network after sending the indicator of the connection release request, and release the RRC connection with the first service network only when receiving an RRC Connection Release message from the first service network. Moreover, the UE may further start a timer in response to sending the indicator of the connection release request, and release the RRC connection with the first service network only when the timer expires but no RRC Connection Release message is received from the first service network.

Figure 4A:
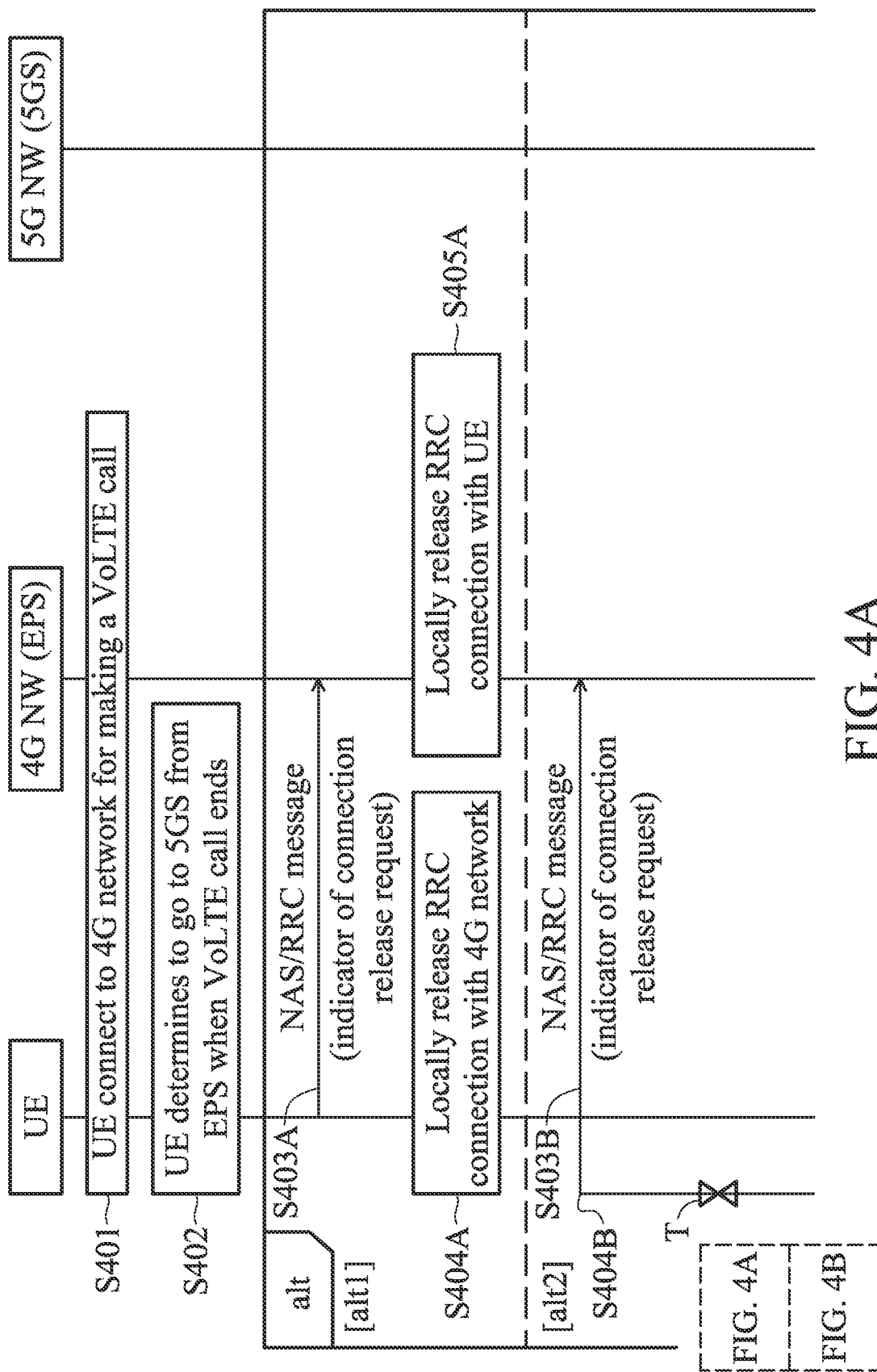
FIGS. 4A~4B show a message sequence chart illustrating multi-RAT coordination according to an embodiment of the application.
Figure 4B:
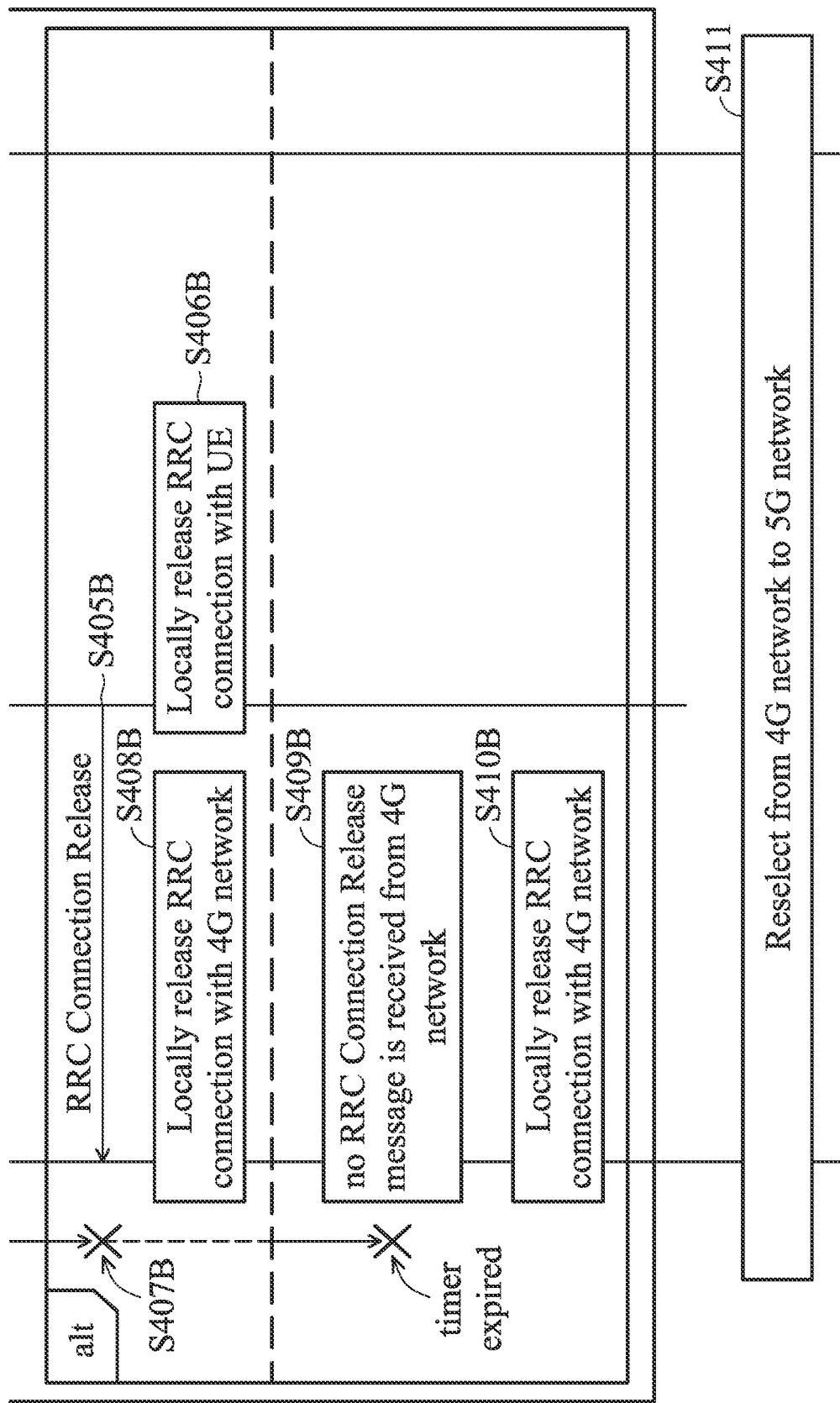

FIGS. 4A~4B show a message sequence chart illustrating multi-RAT coordination according to an embodiment of the application.

In this embodiment, the UE may be a 5GS/EPS capable UE (i.e., a 4G/5G multi-mode UE).

In step S401, the UE connects to the 4G network for making a Voice over LTE (VoLTE) call (e.g., a Mobile-Originated (MO) call or a Mobile-Terminated (MT) call).

In step S402, the VoLTE call ends, and the UE determines to go to 5GS from EPS.

Next, two alternatives are provided to enable the UE to return to 5GS after finishing the voice call service in the 4G network.

[Alternative 1]

In step S403A, the UE sends a NAS/RRC message including an indicator of a connection release request to the 4G network. Please note that the indicator may also be referred to as an indicator of the voice call being finished.

In step S404A, the UE locally releases the RRC connection with the 4G network in response to sending the indicator.

In step S405A, the 4G network locally releases the RRC connection with the UE in response to receiving the indicator.

That is, in alternative 1, both the UE and the 4G network may release the RRC connection as soon as the NAS/RRC message including the indicator is sent or received, without waiting to receive or send a response to the NAS/RRC message including the indicator.

[Alternative 2]

In step S403B, the UE sends a NAS/RRC message including an indicator of a connection release request to the 4G network.

In step S404B, the UE starts a timer upon sending the NAS/RRC message including the indicator.

In step S405B, the 4G network sends an RRC Connection Release message to the UE in response to receiving the NAS/RRC message including the indicator.

In step S406B, the 4G network locally releases the RRC connection upon sending the RRC Connection Release message.

In step S407B, the UE stops the timer in response to receiving an RRC Connection Release message from the 4G network before the timer expires.

In step S408B, the UE locally releases the RRC connection with the 4G network in response to receiving the RRC Connection Release message.

In step S409B, the timer expires and no RRC Connection Release message is received from the 4G network.

In step S410B, the UE locally releases the RRC connection with the 4G network in response to the timer expiring and not receiving an RRC Connection Release message from the 4G network.

In step S411, the UE reselects from the 4G network to the 5G network after the RRC connection with the 4G network is released.

That is, in alternative 2, the UE needs to wait for a response to the NAS/RRC message from the 4G network, before releasing the RRC connection with the 4G network. Optionally, a guard timer may be used to allow the UE to release the RRC connection in case of no response being received from the 4G network in a period of time.

It should be understood that the message sequence chart described in the embodiment of FIGS. 4A~4B is for illustrative purposes only and is not intended to limit the scope of the application. For example, the NAS message including the indicator may be used to trigger a network-initiated inter-system change (including handover or redirection) from an EPS to a 5GS, instead of the RRC connection release procedure. Alternatively, the RRC message including the indicator may be used to trigger an inter-RAT handover to NR, instead of the RRC connection release procedure.

In view of the forgoing embodiment of FIGS. 4A~4B, it will be appreciated that the multi-RAT coordination proposed in the present application realizes a more robust and efficient mobile communication service with the supported RATs, by allowing a 5GS/EPS capable UE to return to a 5GS after finishing the voice call in an EPS. Advantageously, the 5GS/EPS capable UE may be able to obtain faster mobile broadband Internet access from the 5GS.

Figure 5A:
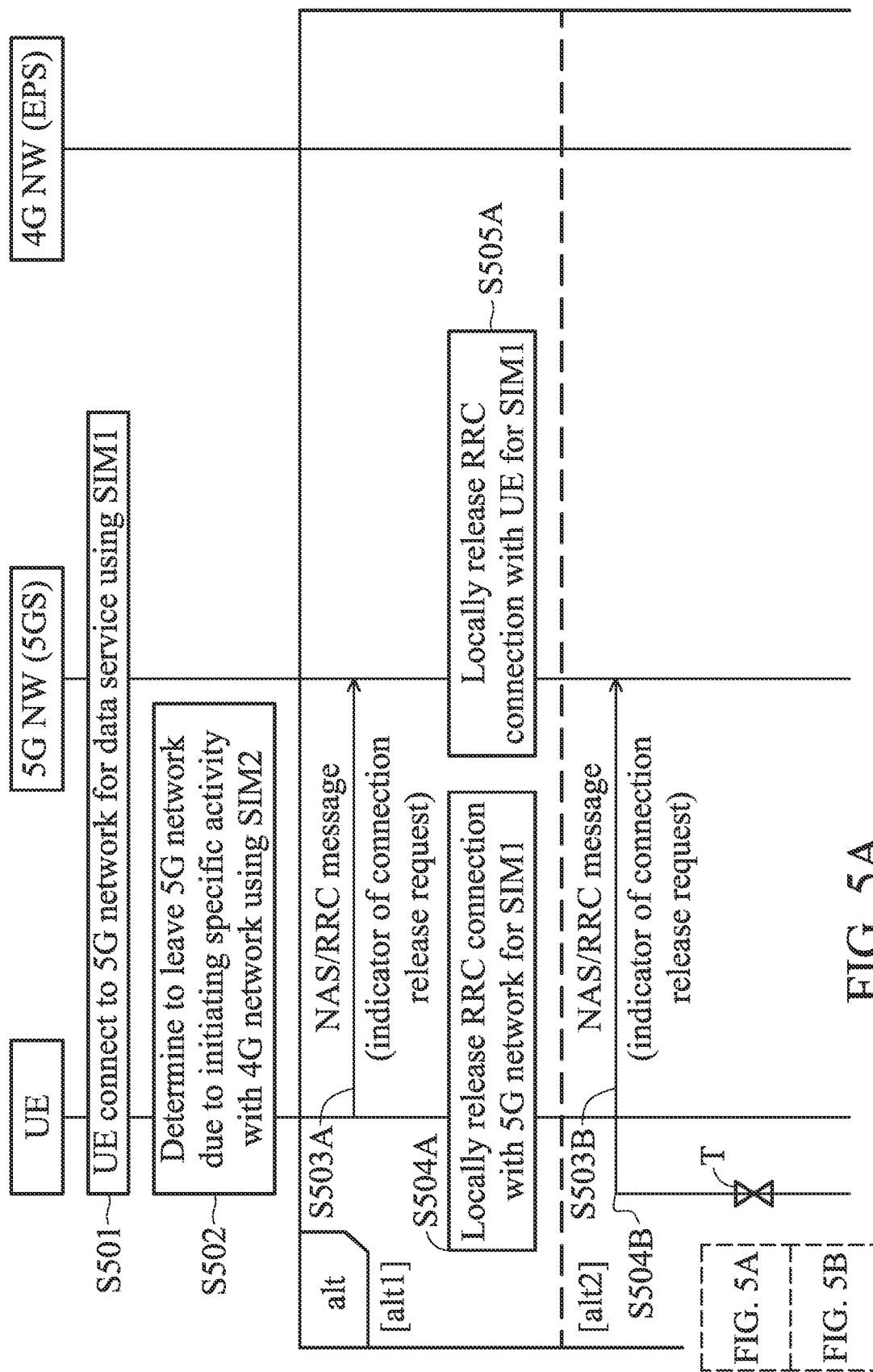
FIGS. 5A~5B show a message sequence chart illustrating multi-RAT coordination according to another embodiment of the application.
Figure 5B:
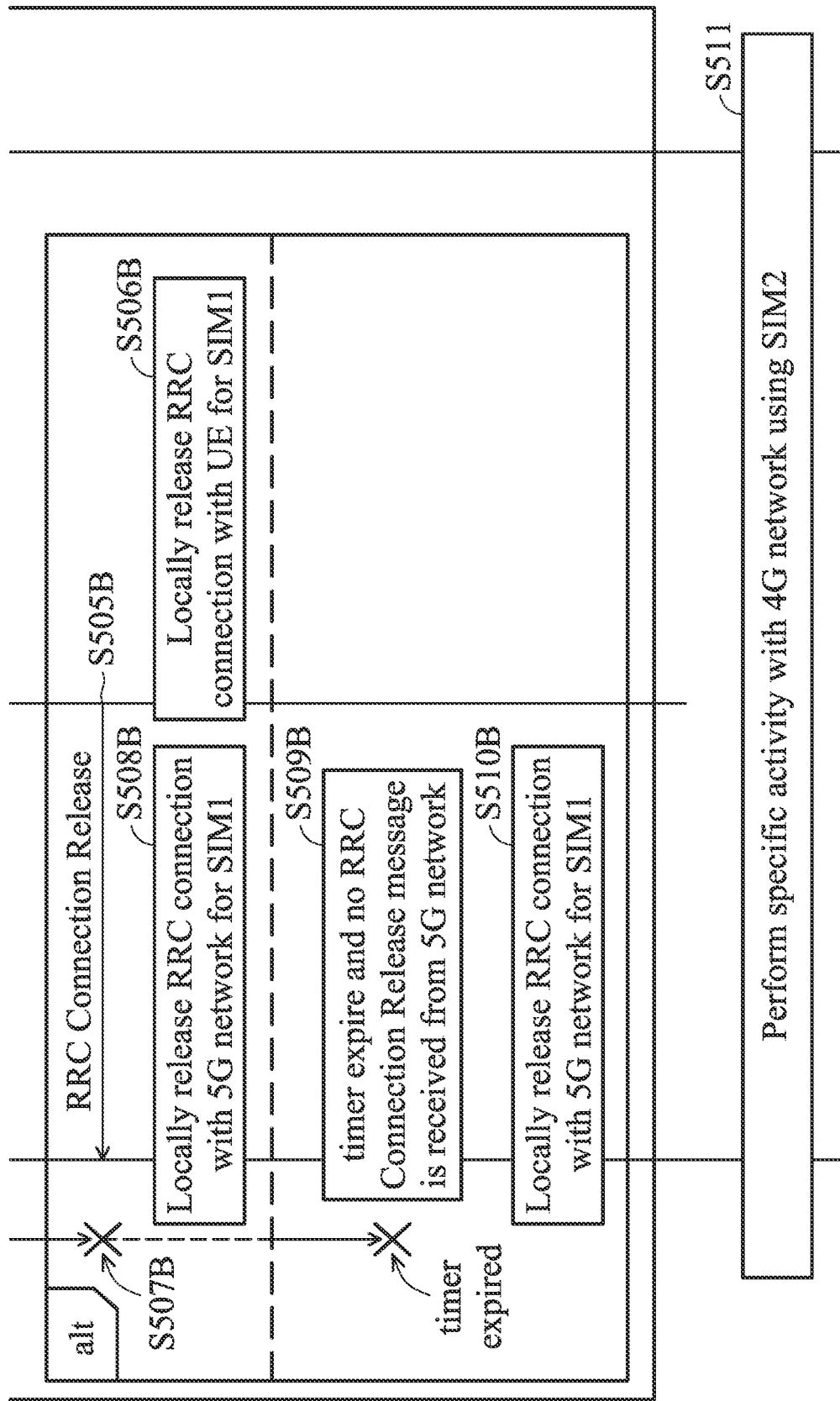

FIGS. 5A~5B show a message sequence chart illustrating multi-RAT coordination according to another embodiment of the application.

In this embodiment, the UE may be a multi-SIM UE with limited Tx/Rx capability (e.g., the UE only has a single RF device).

In step S501, the UE connects to the 5G network (e.g., belonging to PLMN1) for a data service using SIM1.

In step S502, the UE determines to leave the 5G network due to initiating a specific activity (e.g., making a VoLTE call) with the 4G network (e.g., belonging to PLMN2) using SIM2.

Next, two alternatives are provided to enable the UE to synchronize the SIM1 state with the 5G network before performing the specific activity with the 4G network using SIM2.

[Alternative 1]

In step S503A, the UE sends a NAS/RRC message including an indicator of a connection release request to the 5G network. Please note that the indicator may also be referred to as an indicator of the UE switching to another RAT network.

In step S504A, the UE locally releases the RRC connection with the 5G network for SIM1 in response to sending the indicator.

In step S505A, the 5G network locally releases the RRC connection with the UE for SIM1 in response to receiving the indicator.

That is, in alternative 1, both the UE and the 5G network may release the RRC connection for SIM1 as soon as the NAS/RRC message including the indicator is sent or received, without waiting to receive or send a response to the NAS/RRC message including the indicator.

[Alternative 2]

In step S503B, the UE sends a NAS/RRC message including an indicator of a connection release request to the 5G network for SIM1.

In step S504B, the UE starts a timer upon sending the NAS/RRC message including the indicator.

In step S505B, the 5G network sends an RRC Connection Release message to the UE in response to receiving the NAS/RRC message including the indicator.

In step S506B, the 5G network locally releases the RRC connection with the UE for SIM1 upon sending the RRC Connection Release message.

In step S507B, the UE stops the timer in response to receiving an RRC Connection Release message from the 5G network before the timer expires.

In step S508B, the UE locally releases the RRC connection with the 5G network for SIM1 in response to receiving the RRC Connection Release message.

In step S509B, the timer expires and no RRC Connection Release message is received from the 5G network.

In step S510B, the UE locally releases the RRC connection with the 5G network for SIM1 in response to the timer expiring and not receiving an RRC Connection Release message from the 5G network.

In step S511, the UE performs the specific activity (e.g., making a VoLTE call) with the 4G network using SIM2.

That is, in alternative 2, the UE needs to wait for a response to the NAS/RRC message from the 5G network, before releasing the RRC connection with the 5G network. Optionally, a guard timer may be used to allow the UE to release the RRC connection in case of no response being received from the 5G network in a period of time.

It should be understood that the message sequence chart described in the embodiment of FIGS. 5A-5B is for illustrative purposes only and is not intended to limit the scope of the application. For example, SIM2 may be used to initiate the specific activity with another 5G network, instead of the 4G network; or the multi-SIM UE may send the NAS/RRC message including the indicator to a 4G network, if the multi-SIM UE determines to leave the 4G network to perform a specific activity with a 5G network using one SIM when a data service with the 4G network is ongoing using another SIM. In addition, the NAS message including the indicator may be used to trigger a network-initiated inter-system change (including handover or redirection) from an EPS to a 5GS or from a 5GS to an EPS, instead of the RRC connection release procedure. Alternatively, the RRC message including the indicator may be used to trigger an inter-RAT handover to NR or LTE, instead of the RRC connection release procedure.

In view of the forgoing embodiment of FIGS. 5A-5B, it will be appreciated that the multi-RAT coordination proposed in the present application realizes a more robust and efficient mobile communication service with the supported RATs, by allowing a multi-SIM UE to synchronize the connection state with the current RAT network before leaving for another RAT network using another SIM. Advantageously, the radio resource management at the network side may be improved. Moreover, the application layer of the multi-SIM UE may be promptly informed of the state transition of SIM1 from connected mode to idle mode, and countermeasures (e.g., continuing the data service on another SIM) may be taken as soon as possible to improve the user experience regarding service continuity.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A User Equipment (UE), comprising:
   a wireless transceiver, configured to perform wireless transmission and reception to and from a first service network utilizing a first Radio Access Technology (RAT) via a first subscriber identity module (SIM) or a second service network utilizing a second RAT via a second SIM; and
   a controller, configured to:
   connect to the first service network using the first SIM,
   initiate a specific activity with the second service network using the second SIM during a first communication service with the first service network using the first SIM,
   determine to leave the first service network for the second service network due to initiating the specific activity with the second service network,
   send an indicator of a connection release request to the first service network via the wireless transceiver in response to leaving the first service network for the second service network,
   start a timer upon sending the indicator, and
   release a Radio Resource Control (RRC) connection with the first service network upon either expiration of the timer or receipt of an RRC connection release message from the first service network before expiration of the timer.

2. The UE as claimed in claim 1, wherein the indicator of the connection release request is sent in a Non-Access Stratum (NAS) message or an RRC message.

3. The UE as claimed in claim 2, wherein the NAS message is an Evolved Packet System (EPS) Mobility Management (EMM) message or an EPS Session Management (ESM) message in response to the first service network being an EPS; or the NAS message is a 5G Mobility Management (5GMM) message in response to the first service network being a 5G System (5GS).

4. The UE as claimed in claim 3, wherein the EMM message is a Tracking Area Update message or an EMM Status message; the ESM message is a Bearer Resource Modification Request message or an ESM Status message; and the 5GMM message is a Registration Request message, an UL NAS transport message, or a 5GMM Status message.

5. The UE as claimed in claim 2, wherein the RRC message is a UE Assistance Information message.

6. The UE as claimed in claim 1, wherein the controller is further configured to reselect from the first service network to the second service network via the wireless transceiver in response to releasing the RRC connection with the first service network.

7. The UE as claimed in claim 1, wherein a first communication service is a Voice over Long Term Evolution (LTE) (VoLTE) call.

8. A method, executed by a UE communicatively connected to a first service network utilizing a first Radio Access Technology (RAT) via a first subscriber identity module (SIM) RAT or a second service network utilizing a second RAT via a second SIM, the method comprising:
   connecting to the first service network using the first SIM;

initiating a specific activity with the second service network using the second SIM during a first communication service with the first service network using the first SIM;

determining to leave the first service network for the second service network due to initiating the specific activity with the second service network;

sending an indicator of a connection release request to the first service network in response to leaving the first service network for the second service network;

starting a timer upon sending the indicator; and releasing a Radio Resource Control (RRC) connection with the first service network upon either expiration of the timer or receipt of an RRC connection release message from the first service network before expiration of the timer.

9. The method as claimed in claim 8, wherein the indicator of the connection release request is sent in a NAS message or an RRC message.

10. The method as claimed in claim 9, wherein the NAS message is an EMM message or an ESM message in response to the first service network being an EPS; or the NAS message is a 5GMM message in response to the first service network being a 5GS.

11. The method as claimed in claim 10, wherein the EMM message is a Tracking Area Update message or an EMM Status message; the ESM message is a Bearer Resource Modification Request message or an ESM Status message; and the 5GMM message is a Registration Request message, an UL NAS transport message, or a 5GMM Status message.

12. The method as claimed in claim 9, wherein the RRC message is a UE Assistance Information message.

13. The method as claimed in claim 8, further comprising: reselecting from the first service network to the second service network in response to releasing the RRC connection with the first service network.

14. The method as claimed in claim 8, wherein a first communication service is a VoLTE call.

* * * * *